United States Patent
Abraham et al.

(10) Patent No.: US 7,391,317 B2
(45) Date of Patent: Jun. 24, 2008

(54) APPARATUS AND METHOD FOR TRANSMITTING DIGITAL DATA OVER VARIOUS COMMUNICATION MEDIA

(75) Inventors: Charles Abraham, Clarksville, MD (US); Chris Reinert, Frisco, TX (US); John E. Jarels, Laurel, MD (US)

(73) Assignee: Satius, Inc., Las Vegas, NV (US)

( * ) Notice: Subject to any disclaimer, the term of this patent is extended or adjusted under 35 U.S.C. 154(b) by 434 days.

(21) Appl. No.: 11/029,755

(22) Filed: Jan. 5, 2005

(65) Prior Publication Data

US 2006/0049693 A1    Mar. 9, 2006

Related U.S. Application Data

(60) Provisional application No. 60/608,022, filed on Sep. 8, 2004.

(51) Int. Cl.
  *G08B 1/00*    (2006.01)
(52) U.S. Cl. .................. 340/531; 340/825.69; 340/538; 348/148
(58) Field of Classification Search .............. 340/531, 340/538, 932.2, 937, 506, 825.69, 644, 310.11; 348/148
  See application file for complete search history.

(56) References Cited

U.S. PATENT DOCUMENTS

| | | | |
|---|---|---|---|
| 5,351,272 A | 9/1994 | Abraham | 375/38 |
| 5,559,377 A | 9/1996 | Abraham | 307/104 |
| 5,592,482 A | 1/1997 | Abraham | 348/8 |
| 5,625,863 A | 4/1997 | Abraham | 455/3.3 |
| 5,818,127 A | 10/1998 | Abraham | 370/106 |
| 6,014,386 A | 1/2000 | Abraham | 370/485 |
| 6,104,707 A | 8/2000 | Abraham | 340/310.02 |
| 6,144,292 A | 11/2000 | Brown | 340/310.01 |
| 6,396,392 B1 | 5/2002 | Abraham | 375/295 |
| 6,405,261 B1 | 6/2002 | Gaucher | 709/250 |
| 6,407,987 B1 | 6/2002 | Abraham | 340/310.01 |
| 6,426,708 B1 | 7/2002 | Trajkovic et al. | 340/932.2 |
| 6,686,832 B2 | 2/2004 | Abraham | 375/295 |
| 6,709,172 B2 | 3/2004 | Brown | 396/427 |
| 7,026,954 B2* | 4/2006 | Slemmer et al. | 340/932.2 |
| 2003/0218549 A1* | 11/2003 | Logvinov et al. | 340/870.07 |
| 2004/0114560 A1* | 6/2004 | Jacobsen | 370/338 |
| 2004/0212481 A1 | 10/2004 | Abraham | 340/310.01 |
| 2004/0233284 A1* | 11/2004 | Lesesky et al. | 348/148 |
| 2004/0258404 A1* | 12/2004 | Brown | 396/427 |
| 2005/0232624 A1* | 10/2005 | Baldwin | 396/278 |
| 2006/0017324 A1* | 1/2006 | Pace et al. | 307/3 |

* cited by examiner

*Primary Examiner*—Phung T. Nguyen
(74) *Attorney, Agent, or Firm*—Panitch Schwarze Belisario & Nadel LLP

(57) ABSTRACT

A system is described for transmitting video signals over various communication media using digital signal processing techniques. An embodiment of the system uses an orthogonal frequency division multiplexing (OFDM) modulation process that enables high-speed data communications of Ethernet and/or MPEG or JPEG or H264 compressed or uncompressed digital video. A second embodiment frequency modulates the OFDM modulated signal (FM-OFDM). The first and second embodiments are implemented with a transmit Ethernet interface, an MPEG or JPEG or H264 compressed or uncompressed digital video capture device, and a modem including a modulator and demodulator that provides communication with several other modem devices along communication media such as power lines, wireless (air), cable, or twisted pairs.

35 Claims, 11 Drawing Sheets

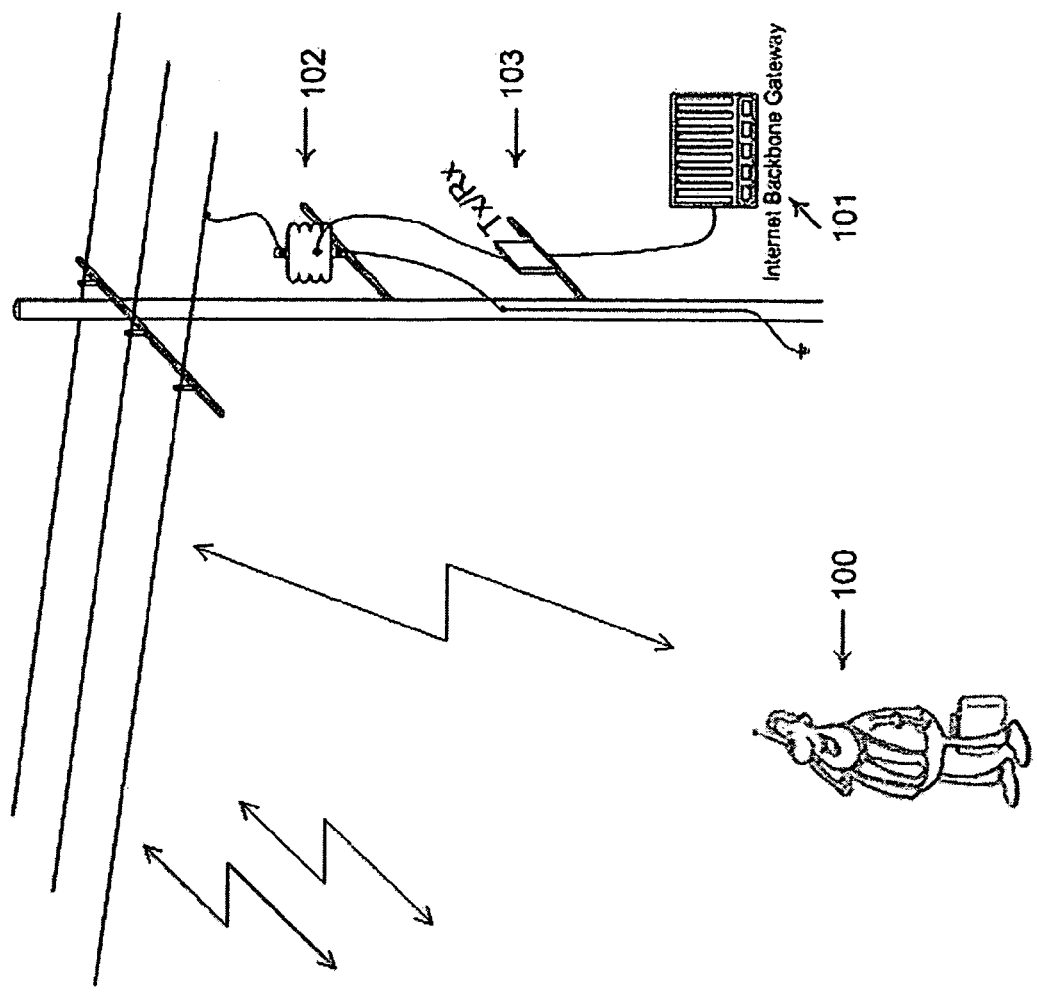
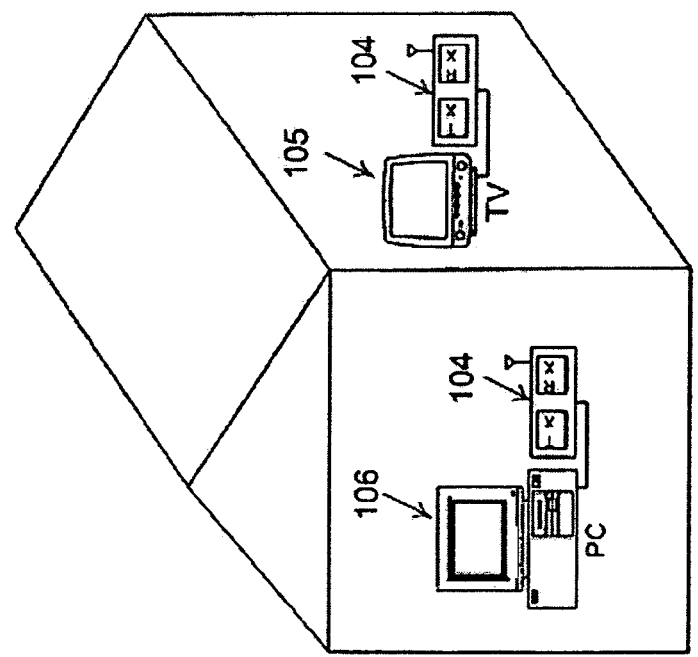
FIGURE 11

APPARATUS AND METHOD FOR TRANSMITTING DIGITAL DATA OVER VARIOUS COMMUNICATION MEDIA

CROSS-REFERENCE TO RELATED APPLICATIONS

This application claims the benefit of Provisional Application No. 60/608,022 filed Sep. 8, 2004 entitled "Digital Video Over Various Communication Media", which is hereby incorporated by reference in its entirety.

BACKGROUND OF THE INVENTION

The present invention relates to a system for transmitting digital data over a variety of communications media.

Ethernet protocol has seen tremendous growth in the past few years. Video compression techniques such as MPEG, JPEG, H264 are also in larger and larger demand. A wide variety of applications are expected to be based on video compression techniques including: surveillance cameras in grocery stores and parking lots, Internet imaging, IP video, and cameras for underground or underwater exploration. Due to technology limits, Ethernet protocol and compressed digital video communications are currently supported on only a limited number of physical media. New technology advancements proposed herein make possible the use of Ethernet protocol and compressed and uncompressed digital video with a variety of communication media.

One digital signal processing technique suitable for transmitting video over a variety of communications media is called orthogonal frequency division multiplexing (OFDM). OFDM is used in the telecommunications industry with multi-modulated carrier frequency transmission and reception. OFDM can be combined with adaptive coding and modulation techniques, such as 64QAM, 32QAM, 16QAM, QPSK and BPSK modulation. In order to approach channel capacity, a certain signal-to-noise ratio (SNR) is required for each coding and modulation combination to achieve a desired bit error rate (BER) performance. Even higher SNRs are needed if the system uses a larger alphabet size for achieving a higher data rate. Adaptive coding can also be used with OFDM to combat SNR variations. For example, when the signal is heavily attenuated through the channel, the same data can be repeated several times to boost the SNR at the receiver end for a reliable data recovery. However, repeating the data reduces the throughput of the communication system.

Other digital signal processing techniques include spread spectrum, quadrature phase shift keying (QPSK); phase shift keying (PSK); 16, 32 and 64 quadrature amplitude modulation (xxQAM); frequency shift keying (FSK), and frequency offset keying modulation.

In order to achieve desired SNRs for reliable communication and to keep the throughput high, the digital data stream may be frequency modulated before transmission and frequency demodulated before being decoded. Frequency modulating the digital data stream gains 10-20 dB in SNR. Resulting in: (1) significantly longer distance communication without increasing the transmit power level and (2) significantly higher throughput to maintain high speed through the communication media. Suitable communication media includes but is not limited to AC and DC power lines, wireless media, cable, telephone lines, twisted pairs, and coaxial cable. DC power line communications includes the communication over the DC wiring harness of moving vehicles like trucks, buses, SUV's and etc. With the advantage of using frequency modulated digital signal processing, Ethernet protocol and compressed or uncompressed digital video with or without audio from a digital camera, digital camcorder, monitor or TV input can be supported over all the above mentioned media.

Frequency offset (ON/OFF) keying is another digital modulation technique that is being used in the communication industry. Differential frequency offset keying (FOK) can improve the SNR through the communication media. Furthermore multiple FOK modulated carrier frequencies can be used to create frequency division multiplexing (FDM) or OFDM where, instead of using QPSK, BPSK, or 16QAM modulation, FOK modulation can be used for multi modulated carrier frequencies. This can further improve SNR by using the frequency modulated DSP technique, where FOK modulation is used for the carrier frequencies.

BRIEF SUMMARY OF THE INVENTION

Briefly stated, the present invention comprises a system for distributing signals over a vehicle power distribution system and for communicating between the vehicle and a remote station. The system comprises: a first modem connected to the vehicle power distribution system, said first modem being configured to: (1) receive and modulate signals from at least one of a source of video, a sensor, a computer, and a telephone and provide a first modulated signal to the vehicle power distribution system, and (2) receive a second modulated signal and a third modulated signal from the vehicle power distribution system, demodulate the second and the third modulated signals and provide a demodulated signal to at least one of a video display, a computer, and a telephone; a second modem connected to the vehicle power distribution system, said second modem being configured to: (1) receive and modulate signals from at least one of a source of video, a sensor, a computer, and a telephone and provide a second modulated signal to the vehicle power distribution system, and (2) receive the first modulated signal and the third modulated signal from the vehicle power distribution system, demodulate the first and the third modulated signals and provide a demodulated signal to at least one of a video display, a computer, and a telephone; and a third modem connected to the vehicle power distribution system, said third modem being configured to: (1) receive the first modulated signal and the second modulated signal from the vehicle power distribution system, demodulate the first and the second modulated signals received from the vehicle power distribution system and (a) provide the demodulated signals to at least one of a monitor, and a computer and (b) remodulate the demodulated first modulated signal and the demodulated second modulated signal and transmit the remodulated signals to the remote station, and (2) receive a fourth modulated signal from the remote station, demodulate and remodulate the fourth modulated signal and provide the remodulated signal to the vehicle power distribution system, and (3) receive and modulate signals from at least one of a source of video, a sensor, a computer, and a telephone and provide a fifth modulated signal to the vehicle power distribution system and a sixth modulated signal to the remote station.

Another aspect of the invention comprises a monitoring system for twenty four hour monitoring of a parking lot, in which monitoring signals are transmitted though a lighting power system of the parking lot. The monitoring system comprises: a master modem configured to receive a modulated, a time division multiplexed signal from the lighting power system of the parking lot, and provide a demodulated signal to a recording device, and a plurality of slave modems, each of which is configured to receive a video signal from a camera, modulate and time division multiplex the video signal and provide the modulated, time division multiplexed signal to the lighting power system, wherein each of the slave modems and each of the cameras receive operating power from the lighting power system, wherein the lighting power is available for only a portion of each twenty four hour period, and wherein each slave modem and each camera includes means for operating when the lighting power is not available.

A further aspect of the present invention is security monitoring system which utilizes line power within a structure for transmission of signals between the components thereof. The system comprises: a master modem configured to receive a modulated, a time division multiplexed signal from the power line, to provide a demodulated signal in the form of a web page for transmission over the Internet and to receive commands from the Internet, and a plurality of slave modems, each of which is configured to receive a video signal from a camera, modulate and time division multiplex the video signal and provide the modulated, time division multiplexed signal to the power line, wherein the video signal from any one of the cameras may be selected by the reception of an appropriate one of the commands.

Another aspect of the invention comprises a system for transmitting a video signal over an electrical power line connected to a plurality of premises comprising: a source of a video signal, a first modem connected to the power line which receives the video signal via the Internet from the source, a second modem connected to the power line which receives the video signal from the first modem and a display device which receives the video signal from the second modem.

Another aspect of the invention comprises a system for transmitting a video signal over an electrical power line connected to a plurality of premises comprising: a source of a video signal, a first modem connected to the power line which receives the video signal from the source, a second modem connected to the power line which receives the video signal from the first modem and a display device which receives the video signal from the second modem via the Internet.

Another aspect of the invention comprises a system for transmitting a cable television signal over an electrical power line connected to a plurality of premises using orthogonal frequency division modulation or frequency modulation-orthogonal frequency division modulation comprising: a first modem connected to the power line which receives the cable television signal, a second modem connected to the power line which receives the cable television signal from the first modem and a display device which receives the cable television signal from the second modem.

A further aspect of the invention comprises a system for wirelessly communicating signals between the conductors of two separate power lines and/or wirelessly communicating between one or more conductors of a power line and a wireless communication device.

Another aspect of the invention comprises a system for communicating over a power line in which a master modem connected to the power line transmits a plurality of OFDM or FM-OFDM signals over the power line to a plurality of receivers connected to the power line, where each of the slave modems is configured to operate in one of N sub-networks and adapted to receive the OFDM or FM-OFDM signal from the master modem in a corresponding transmit frequency band and to transmit an OFDM or FM-OFDM signal to the master modem in a corresponding receive frequency band, wherein the slave modems in each sub-network transmit a time division multiplexed signal.

BRIEF DESCRIPTION OF THE SEVERAL VIEWS OF THE DRAWINGS

The foregoing summary, as well as the following detailed description of the preferred embodiments of the invention, will be better understood when read in conjunctions with the appended drawings. For the purpose of illustrating the invention, there are shown in the drawings embodiments that are presently preferred. It should be understood, however, that the invention is not limited to the precise arrangement and instrumentalities shown. In the drawings, like numerals are used to indicate like elements throughout. In the drawings:

FIG. 11 is a diagram depicting the transmission of radio frequency signals between a power line, stationary wireless communication devices and a mobile wireless communication device.

DETAILED DESCRIPTION OF THE INVENTION

Figure 1:
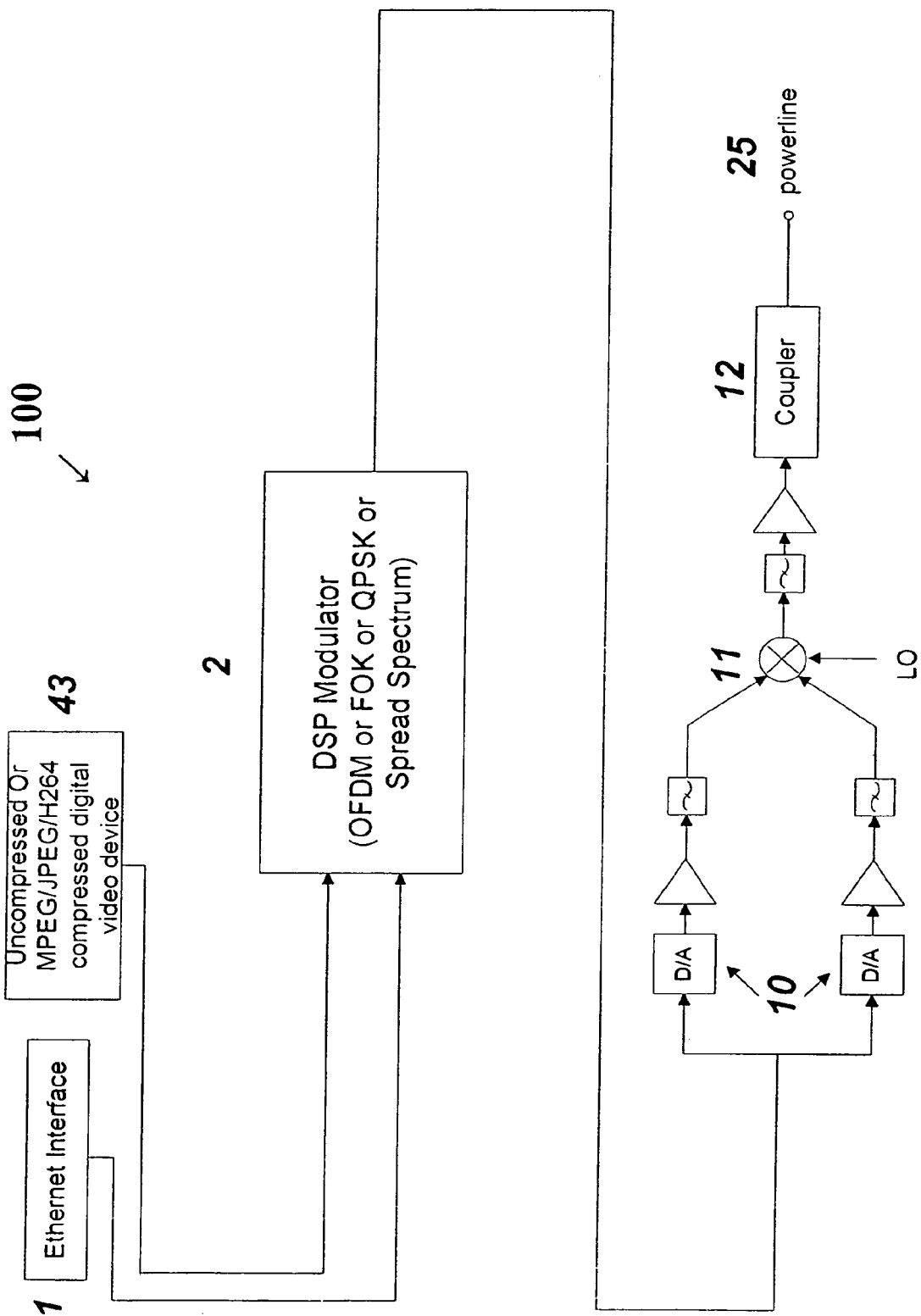
FIG. 1 is a block diagram of a system for transmitting digital signals over a variety of communications media in accordance with a first embodiment of the invention.

Ethernet and MPEG, JPEG and H264 compressed and uncompressed digital video signals are generally transmitted over twisted-pairs or coaxial cables by means of baseband modulation. The present invention, using digital signal processing, is capable of transmitting such signals over various communication media, such as air and electric power lines in addition to twisted-pairs and cables. The present invention, therefore, drastically expands the application of Ethernet and MPEG, JPEG and H264 compressed or uncompressed digital video to meet surging everyday communication needs. The present invention can use either well known video compression techniques like MPEG I, MPEG II, MPEG III, MPEG IV, JPEG, JPEG 2000 or other types of video compression format whether implemented in software, firmware or chip form.

Frequency modulation (FM) is well known modulation technique for use in a wide variety of applications where long distance communications are required. Typically, FM gains 10-40 dB signal-to-noise ratio (SNR) depending on the modulation factor that is being used. The bandwidth of the FM signals determines the SNR. Larger bandwidth communication devices have smaller SNR than smaller bandwidth devices.

To achieve high speed communication, a higher bandwidth is required than for low speed communications. If a single high speed signal or a plurality of carrier frequencies each carrying lower speed communications are used for communication, then the bandwidth needs to be larger and therefore the SNR will be lower. For example, if one needs to transmit 10 Mbps over a communication media using a 250 MHz. Frequency modulated carrier frequency over a 60 MHz bandwidth, then the level of noise will be about −67 dBm. Even recovering about 15-20 dB SNR by using wideband FM will not provide reliable long distance communications because the noise level is too high.

Orthogonal frequency division multiplexing (OFDM) is another modulation technique useful for high speed communications. By using OFDM with 1024 carriers with a 30 MHz. Bandwidth at a center frequency of 250 Mhz, one can reach 120 Mbps speed with a noise level of −86 dBm at every 30 KHz. Carrier frequency. Consequently OFDM can achieve longer distance and higher speed communication than wideband FM although OFDM also depends on the transmitted power. OFDM is a better choice for FCC emission consideration. If FM is used for high speed data communications, the SNR will generally be lower than for an OFDM system The present invention can also transmit and receive simultaneously on multiple frequency bands to further frequency division multiplex those bands together and to thereby increase the actual throughput speed. For example, OFDM bands with 30 MHz. Bandwidth can reach 120 Mbps speed. Transmitting a 30 MHz. Bandwidth of OFDM bands at 1 GHz., 1.1 GHz., 1.2 GHz., 1.3 GHz., 1.4 GHz., 1.5 GHz., 1.6 GHz., 1.7 GHz., 2 GHz., 2.1 GHz., and receiving OFDM bands full duplex at 2.3 GHz., 2.4 GHz., 2.5 GHz., 2.6 GHz., 2.7 GHz., 2.8 GHz., 2.9 GHz., 3 GHz., 3.1 GHz., 3.2 GHz. And multiplexing bands together using frequency division multiplexing (FDM) will result in up to 1.2 Gbps speed for transmission and up to 1.2 Gbps speed for reception over a power line with a linear coupler. Transmission over power lines does not create signal harmonic emission, that would otherwise interfere with the other frequency band channels. Using FM OFDM per channel results in a lower total (multiplexed) speed like 600 Mbps for transmit and 600 Mbps for receive for the same frequency band channels.

The present invention accepts input from an analog video source like a camera or a cable TV in the well known form of base-band NTSC video and audio, S-video or RF video (like channel 3 or 4). The present invention also accepts input from a digital serial or parallel video source such as a camera, DVD or computer source through a FireWire interface. Such digital formats could come directly from a video chip without compression. The present also invention provides output to an analog video receiver like a TV set, monitor or computer in the well known form of NTSC video and audio, S-video, or RF video (like channel 3 or 4). The present invention also provides output to a digital serial or parallel video TV receiver, DVD or computer monitor through a FireWire interface.

The present invention may also include security protocols, i.e. Encryption, in order to prevent hackers from receiving confidential information. The encrypted data streams typically put in the MAC address level, which is located in the Ethernet protocol. Mobil or cellular phones have secure encryption which changes a password every second.

Referring now to FIG. 1, there is shown a system 100 for transmitting digital signals over a variety of communications media in accordance with a first embodiment of the invention. The digital signals 43 may be MPEG, JPEG or H264 compressed digital video or uncompressed digital video, with or without audio and may originate from a digital camera, a digital camcorder, or other source of digital video data or the digital video data may be supplied from an Ethernet interface 1. The digital video signals 1, 43 are applied to a digital signal processor modulator (DSPM) 2. The DSPM 2 may be implemented by any known technique, such as one or more programmable digital signal processors, very large scale integrated circuits (VLSI) or a combination of both. Preferably, the DSPM 2 is an orthogonal frequency division multiplexing (OFDM) type of modulator which is a multi-carrier modulation scheme utilizing a fast Fourier transform (FFT). Alternatively, frequency offset keying (FOK), quaternary phase shift keying (QPSK) or spread spectrum may be used in place of OFDM.

The DSPM 2 receives forward channel quality feedback from a receiver and selects an appropriate error correction code, such as a block code or a convolutional code, to encode the digital video signals. The encoded video signals are interleaved to break up error bursts at the receiver end into scattered individual errors across the transmission. The DSPM 2 further converts the interleaved bits into real or complex symbols in an alphabet which is selected based on the channel quality feedback and the desired data rate. Different alphabets can be used for a higher data rate at the target performance requirement, for example sixty-four level quaternary amplitude modulation (64-QAM) or sixteen level quaternary amplitude modulation (16-QAM) can be used to replace QPSK or binary phase shift keying (BPSK) when the channel signal-to-noise ratio (SNR) is high. The receiver feedback, the code selection, the alphabet selection accomplishes the adaptive coding and adaptive modulation for the DSPM 2.

After pilot symbols are inserted into the composite symbol stream, a single carrier is generated using an inverse fast Fourier transform (IFFT). A tailing part is copied to the beginning of the IFFT results to make a cyclic prefix (CP). A limiter is used to limit the dynamic range of the DSPM 2 output. An optional digital low pass filter can also be used to confine the signal within a desired pass band. Filtering may alternatively be achieved with an analog low pass filter. The in-phase (I) and quadrature (Q) components of the DSPM 2 output signal are fed to two separate digital-to-analog converters (DAC) 10. The analog outputs of the DACs are amplified, filtered and mixed in a mixer 11 with the local oscillator signal (LO). The output of the mixer 11 output is filtered, amplified and applied to a coupler or antenna 12, which transmits the carrier frequency signals to a communication media 25 such as power line, air, coax cable, or twisted pair cable.

Preferably, the present invention uses either a capacitive type of coupler or resin/dielectric-filled type of coupler for connection to overhead or underground electric power lines. Preferably, the coupler 12 matches the power line 25 characteristic impedance to the coupler 12 and also matches the characteristic impedance of the amplifier.

A capacitive transformer (coupler) is a transformer in which the capacitive coupling between the primary and secondary side of the transformers is strong. Normally transformers have strong inductive coupling between the primary and secondary side. They also have some capacitive coupling but it is small. Making a capacitive coupler means the capacitive coupling between the primary and the secondary sides of the transformer is strong and the inductive coupling is weaker then usual. Usually, in RF transformers, inductive coupling is typically between 70-90%. In capacitive couplers, the capacitive coupling is typically between 40-60%. The secondary side of a capacitive coupler, that connects to the transmitter and/or receiver, is wound with about an equal number of turns as the primary side of the coupler that is connected through a capacitor to the power line.

A resin-filled coupler is a transformer in which resin is placed between the primary and the secondary windings of the transformer. The resin provides higher dielectric isolation between the two windings of the transformer as well as protection from breakdown, when the primary side is conducting AC or DC currents. Resin filled transformers also tend toward a capacitively coupled transformer.

A dielectric-filled coupler is a transformer filled with a dielectric material. A capacitive transformer can be filled with resin or other dielectric material. The transformer primary impedance is the same order of magnitude or larger as that of overhead or underground power lines. A capacitive coupler with a data port may be used here to couple a modem to the power line. The power line may be terminated with a resistance approximately equal to the characteristic impedance of the power transmission cable.

Figure 2:
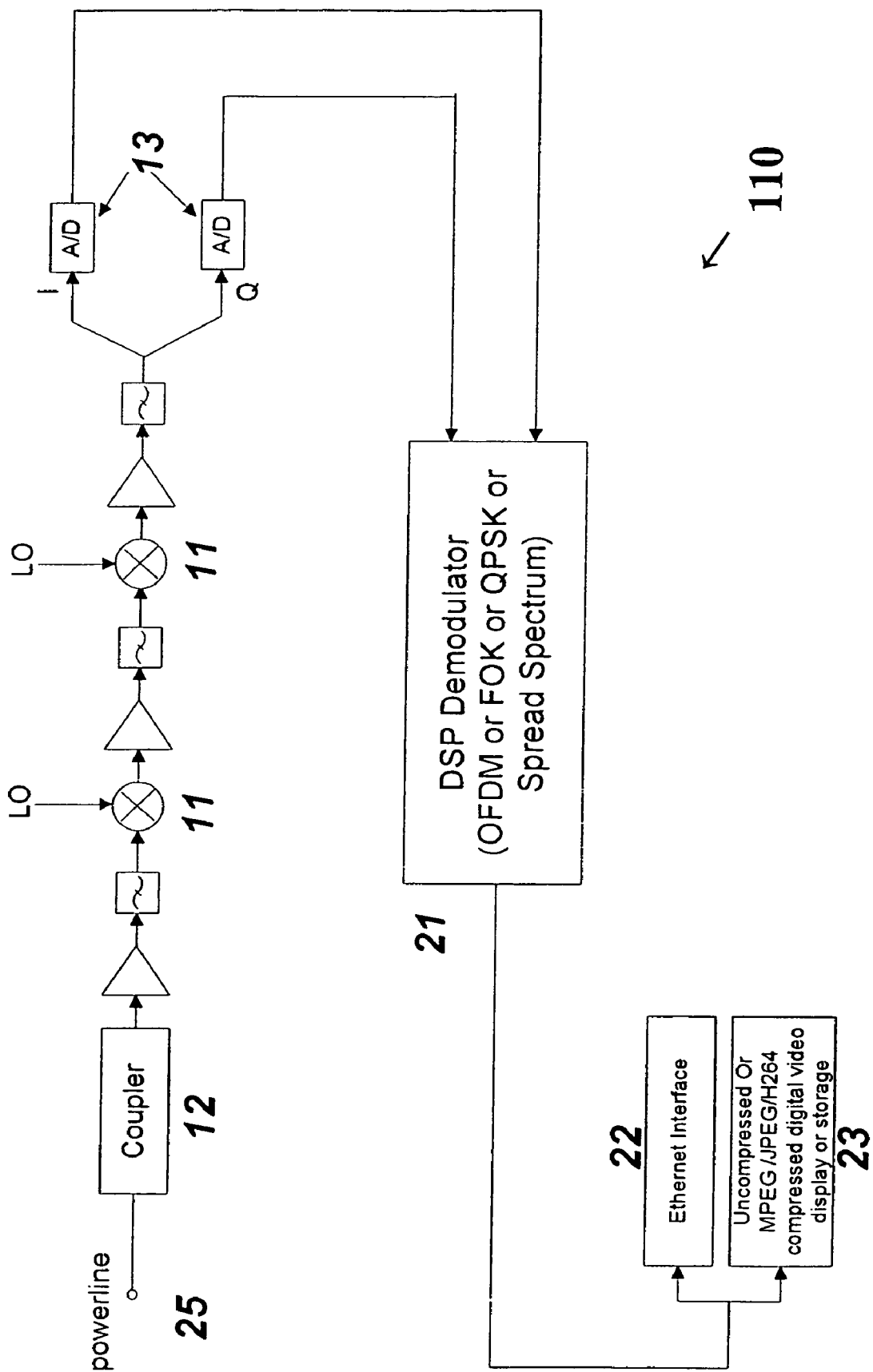
FIG. 2 is a block diagram of a system for receiving digital signals from a variety of communications media in accordance with a second embodiment of the invention.

Referring now to FIG. 2 there is shown a system 110 for receiving and demodulating digital signals from a variety of communications media in accordance with a second embodiment of the invention. In the analog portion of the system 110, the carrier frequency signal received from the physical transmission media 25 by means of a coupler or antenna 12 is amplified, filtered and mixed in the mixer 11 to generate an intermediate frequency (IF) signal. The IF signal is again amplified, filtered and mixed in another mixer 11 to generate a base band signal. This base band signal is further amplified and filtered. I and Q components of the filter output are sent to two separate analog-to-digital converters (ADC) 13. The digitized I/Q components are applied to a digital signal processor demodulator (DSPD) 21. The DSPD 21 may be implemented by any known technique, such as with programmable digital signal processors, very large scale integrated circuits (VLSI) or a combination of both. The DSPD 21 locates a frame header in the demodulated signal by means of synchronization algorithms. Frequency offset or the difference between transmit LO and receive LO is estimated and compensated for. Based on the knowledge of the frame header, the cyclic prefix of each transmitted IFFT block is removed and a fast Fourier transform (FFT) is conducted. From the obtained results on pilot-bearing carriers, a channel estimation algorithm delivers noise power and channel gain estimates, facilitating the generation of hard or soft decisions on the encoded bits. The hard or soft decisions are finally de-interleaved and fed to a decoder that provides bit streams for upper layer applications such as Ethernet 22 or MPEG, JPEG or H264 compressed or uncompressed video 23.

Figure 3:
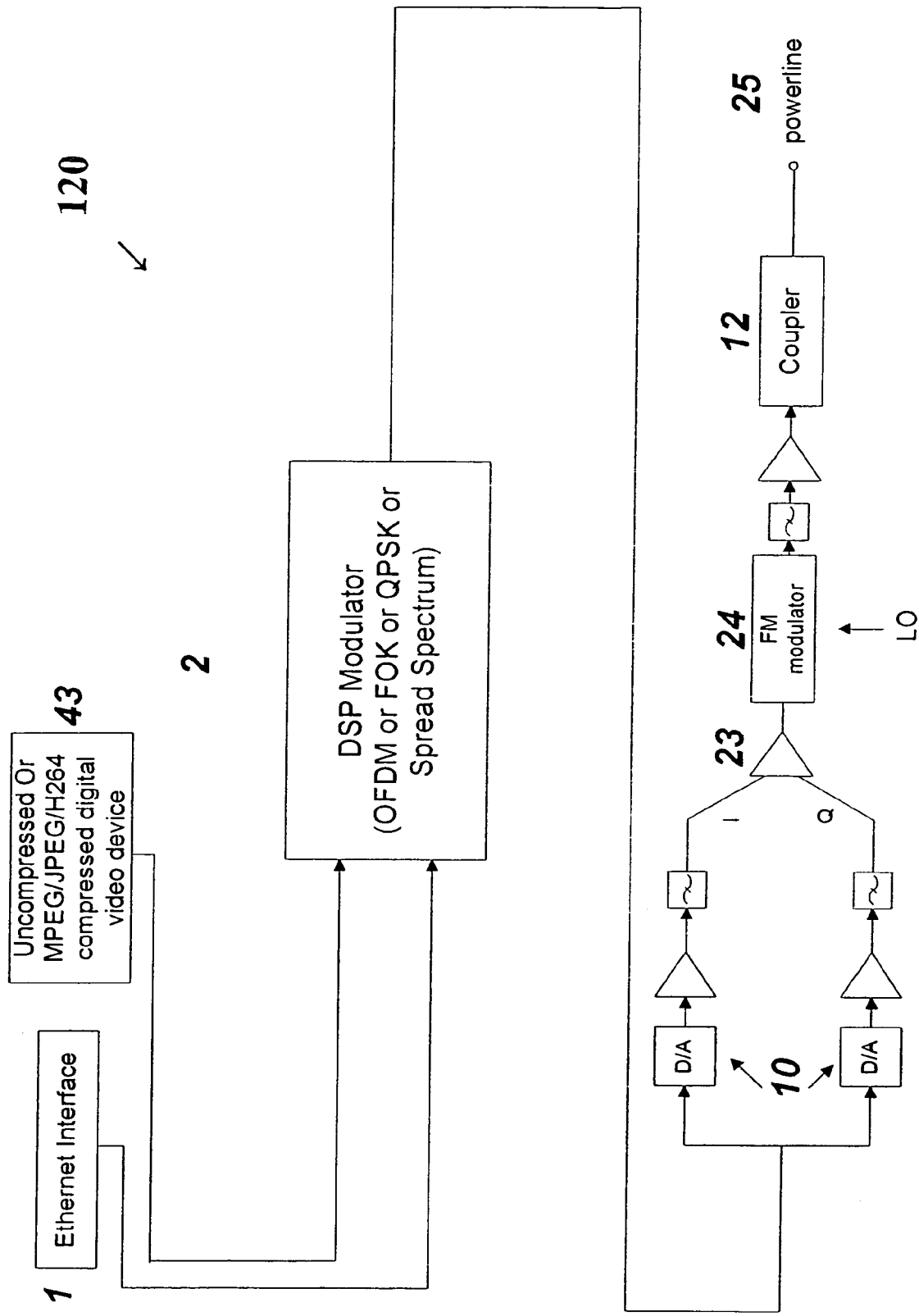
FIG. 3 is a block diagram of a system incorporating a frequency modulator for transmitting digital signals over a variety of communications media in accordance with a third embodiment of the invention.

Referring now to FIG. 3 there is shown a block diagram of an FM-OFDM system 120, referred to hereafter as an FM-OFDM system, incorporating a frequency modulator for transmitting digital signals over a variety of communications media in accordance with a third embodiment of the invention. Preferably, the DSPM 2 is an OFDM modulator. OFDM is a multi-carrier modulation scheme which uses a fast Fourier transform (FFT). Alternatively, the DSPM 2 may use frequency offset keying (FOK), quaternary phase shift keying (QPSK) or spread spectrum in place of OFDM. The DSPM 2 takes input bit streams from an Ethernet interface 1 and/or from an MPEG, JPEG or H264 compressed digital video device 43. It receives forward channel quality feedback from a receiver and selects a good code, such as a block code or a convolutional code, to encode the bit streams accordingly, then interleaves the encoded bits to break error bursts at the receiver end into scattered individual errors across the whole transmission. The receiver feedback, the code selection, the constellation selection, coding & interleaving, and modulation accomplishes adaptive coding and adaptive modulation of the DSPM 2. The DSPM 2 also converts interleaved bits into real or complex symbols in an alphabet which is selected based on channel condition feedback. Different alphabets can be used for a higher data rate at the target performance requirement, for example 64-QAM or 16-QAM can be used to replace QPSK or BPSK when the channel signal-to-noise ratio is high. After pilot symbols are inserted, the composite symbol stream modulates specific carriers using an inverse fast Fourier transform (IFFT). A tailing part is copied to the beginning of the IFFT to make a cyclic prefix (CP). A limiter is used to make sure the digital signal is within a prescribed dynamic range. An optional digital low pass filter can also be used to confine the signal within a desired pass band. Filtering may alternatively be achieved with an analog low pass filter. The in-phase (I) and quadrature (Q) components of the digital signal are now fed to two separate (DACs) 10. The analog outputs of the DACs 10 are amplified, filtered. I and Q signals are added in an adder 23 and frequency modulated in an FM modulator 24 with a local oscillator (LO) signal. The FM modulator 24 output is filtered, amplified and applied to a coupler or antenna 12, which transmits the signal to the communication media 25 such as a power line, air, coax cable, or twisted pair cable.

The challenge to do FM OFDM is that OFDM carrier frequencies do not have a flat frequency response when output from the DACs 10. The magnitude of variations between each carrier frequency can usually reach 12 dB. Thus, the OFDM processing needs to include more processing power and higher sampling rates in order to limit the OFDM carrier frequencies to smaller variations of magnitude.

Figure 4:
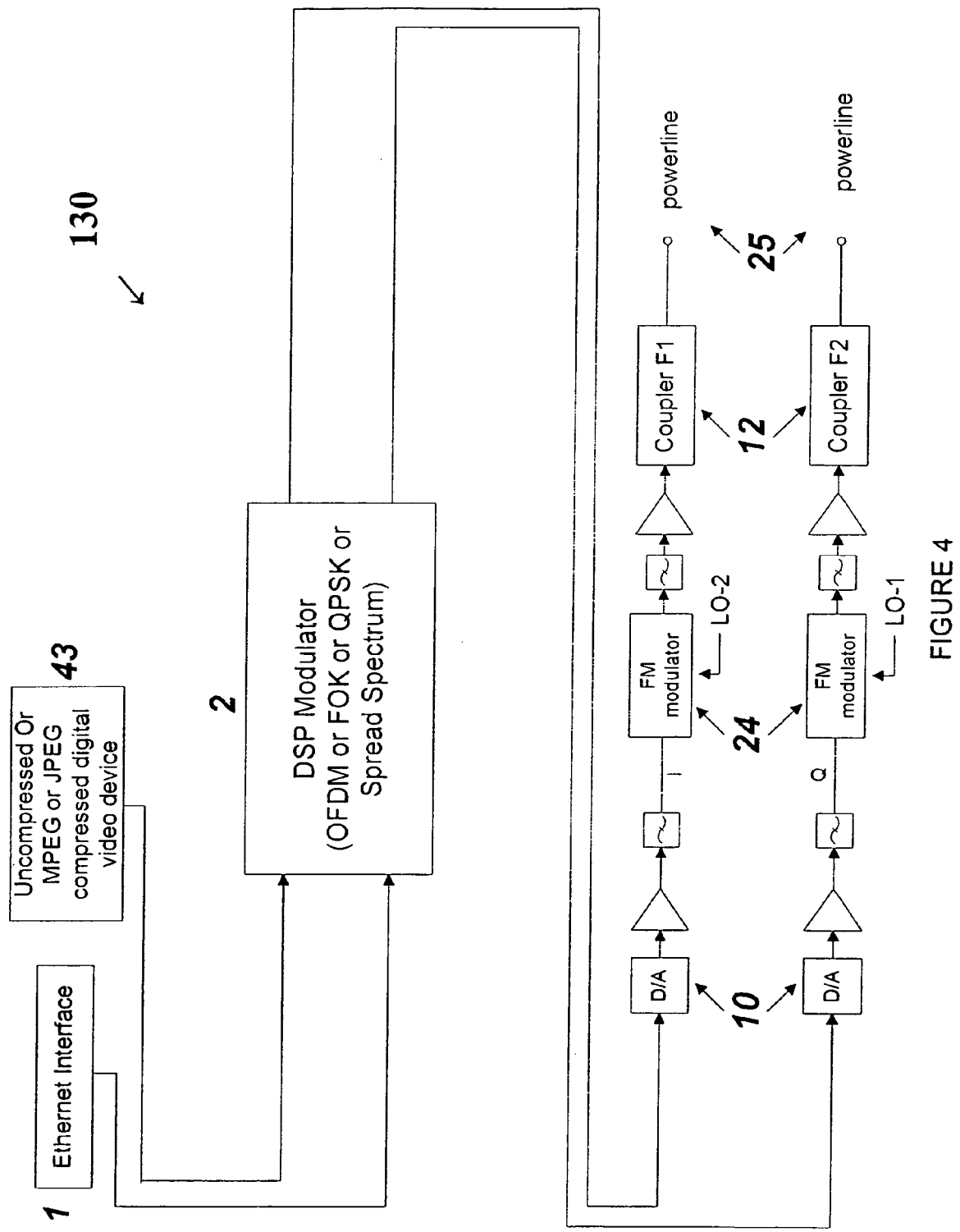
FIG. 4 is a block diagram of a system for transmitting digital signals over a variety of communications media incorporating multiple frequency modulators in accordance with a fourth embodiment of the invention.

Referring now to FIG. 4 there is shown a block diagram of a system 130 incorporating a frequency modulator for transmitting digital signals over a variety of communications media in accordance with a fourth embodiment of the invention. Preferably, the DSPM 2 is an OFDM modulator. OFDM is a multi-carrier modulation scheme which uses a fast Fourier transform (FFT). Alternatively, the DSPM 2 may use frequency offset keying (FOK), quaternary phase shift keying (QPSK) or spread spectrum in place of OFDM. The DSPM 2 takes input bit streams from an Ethernet interface 1 and/or from an MPEG, JPEG or H264 compressed digital video device 43. It receives forward channel quality feedback from a receiver and selects a good code, such as a block code or a convolutional code, to encode the bit streams accordingly, then interleaves the encoded bits to break error bursts at the receiver end into scattered individual errors across the whole transmission. The receiver feedback, the code selection, the constellation selection, coding & interleaving, and modulation accomplishes adaptive coding and adaptive modulation of the DSPM 2. The DSPM 2 also converts interleaved bits into real or complex symbols in an alphabet which is selected based on channel condition feedback. Different alphabets can be used for a higher data rate at the target performance requirement, for example 64-QAM or 16-QAM can be used to replace QPSK or BPSK when the channel signal-to-noise ratio is high. After pilot symbols are inserted, the composite symbol stream modulates specific carriers using an inverse fast Fourier transform (IFFT). A tailing part is copied to the beginning of the IFFT to make a cyclic prefix (CP). A limiter is used to make sure the digital signal is within a prescribed dynamic range. An optional digital low pass filter can also be used to confine the signal within a desired pass band. Filtering may alternatively be achieved with an analog low pass filter. The in-phase (I) and quadrature (Q) components of the digital signal are now fed to two separate (DACs) 10. The analog outputs of the DACs 10 are amplified, filtered, and the I and Q signals are separately FM modulated in FM modulators 24 with two different local oscillator (LO) signals. The two FM Modulators 24 output create separate frequency bands F1 and F2 (for I and Q) for communication which is filtered, amplified and sent to a coupler F1 and to a coupler F2 or to an antenna F1 and to an antenna F2 12 which transmit the signals to the communication media 25 such as a power line, air, coax cable, or twisted pair cable.

Figure 5:
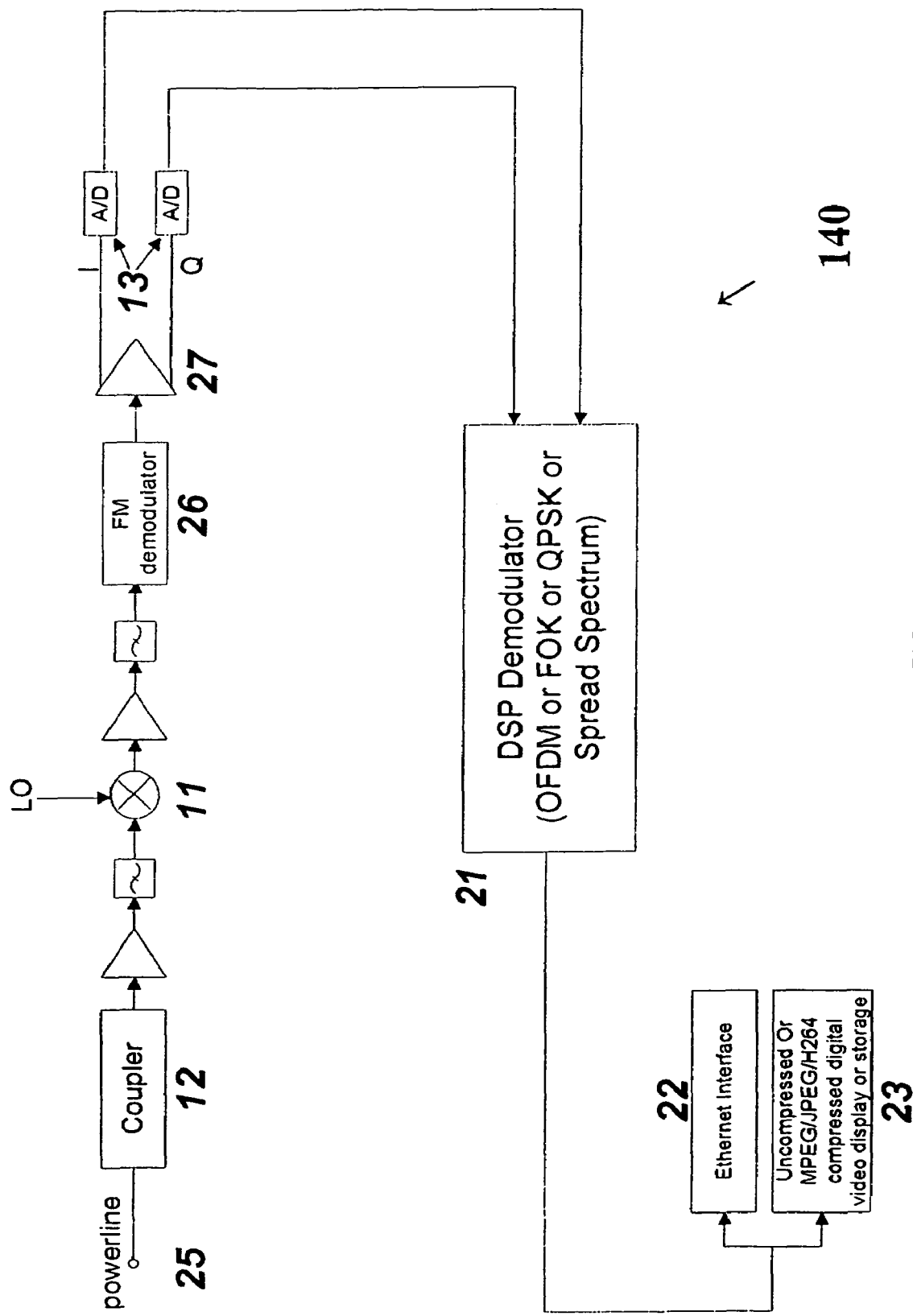
FIG. 5 is a block diagram of a system incorporating a frequency demodulator for receiving digital signals in accordance with a fifth embodiment of the invention.

Referring to FIG. 5, there is shown a block diagram of an FM-OFDM system 140 incorporating multiple frequency demodulators for receiving digital signals in accordance with a fifth embodiment of the invention. In the analog portion of the system 140, the carrier frequency signal is received from physical transmission media 25 by means of a coupler or antenna 12. The received signal is amplified, filtered and mixed in mixer 11 to generate an IF signal. The IF signal is again amplified, filtered and FM demodulated in FM demodulator 26 to generate a base band signal. The base band signal is further converted into I and Q components, amplified and filtered in converter 27. The I and Q components of the converter output are sent to two separate ADCs 13. The digitized I/Q components are applied to a digital signal processor demodulator (DSPD) 21. The DSPD 21 locates a frame header in the demodulated signal by means of synchronization algorithms. Frequency offset or the difference between transmit LO and receive LO is estimated and compensated for. Based on the knowledge of the frame header, the cyclic prefix of each transmitted IFFT block is removed and a fast Fourier transform (FFT) is conducted. From the obtained results on pilot-bearing carriers, a channel estimation algorithm delivers noise power and channel gain estimates, facilitating the generation of hard or soft decisions on the encoded bits. The hard or soft decisions are finally de-interleaved and fed to a decoder that provides bit streams for upper layer applications such as Ethernet 22 or MPEG, JPEG or H264 compressed or uncompressed video 23.

Figure 6:
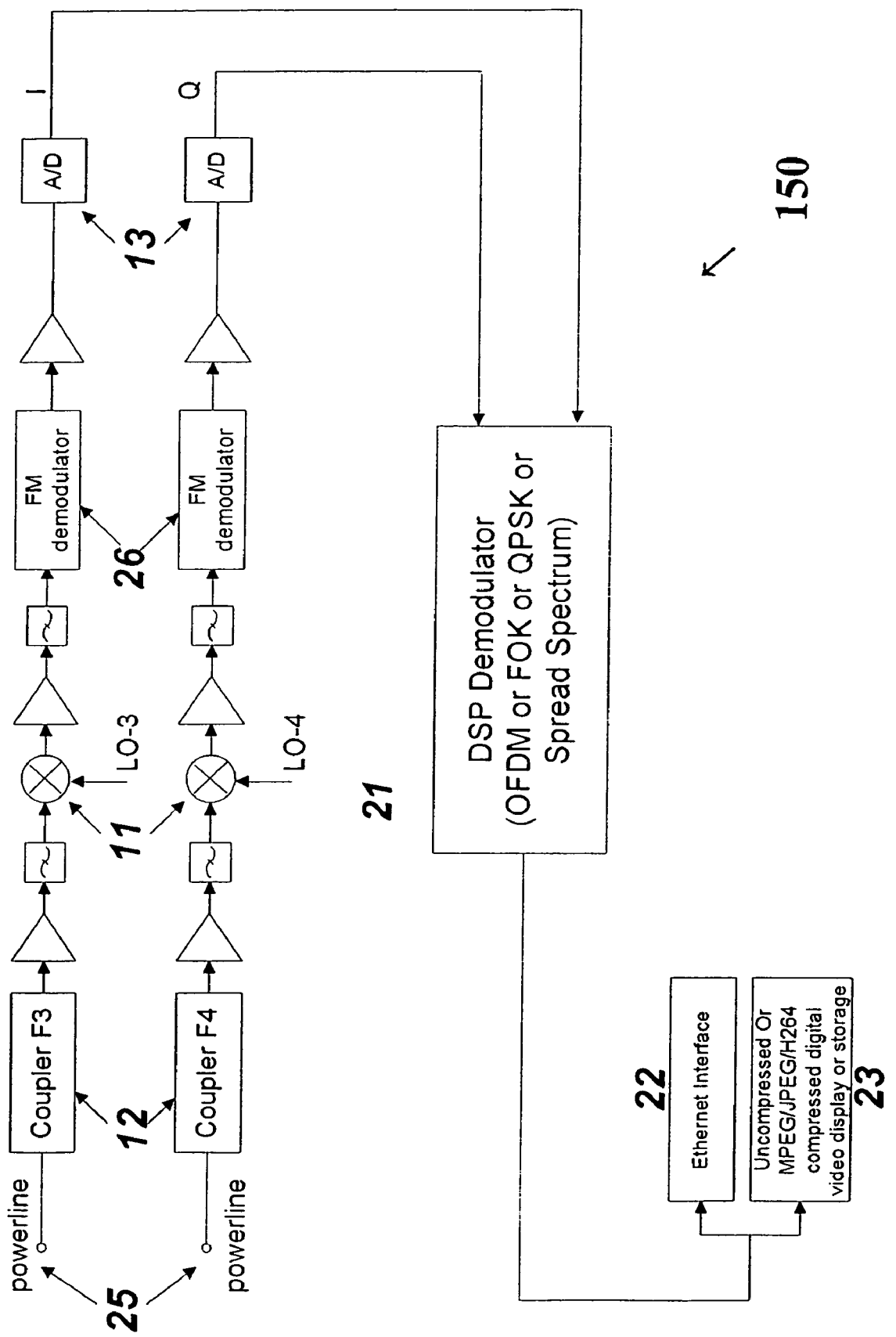
FIG. 6 is a block diagram of a system for receiving digital signals incorporating multiple frequency demodulators in accordance with a sixth embodiment of the invention.

Referring now to FIG. 6 there is shown a block diagram of an FM-OFDM system 150 incorporating multiple FM demodulators for receiving and demodulating digital signals in accordance with a sixth embodiment of the invention. In the analog portion of the system 150, the two carrier signals at frequency bands F3 and F4 are received from the physical transmission media 25 by means of the couplers or the antennas 12. The received signals are amplified, filtered and mixed in dual mixers 11 to generate dual IF signals. The IF signals are again amplified, filtered and the IF signals are separately FM demodulated in FM demodulators 26 to generate baseband I and Q signals. The baseband I and Q signals are separately amplified and filtered and applied to two separate ADCs 13. The digitized I and Q signals are input to the DSPD 21. Preferably, the DSPD 21 is an OFDM demodulator. Alternatively, the DSPD 21 may use frequency offset keying (FOK), quaternary phase shift keying (QPSK) or spread spectrum in place of OFDM.

From the digitized I/Q components, the DSPD 21 locates the frame header by means of synchronization algorithms. Frequency offset or the difference between transmit LO and receive LO is estimated and compensated. Based on the knowledge of the frame header, the cyclic prefix of each transmitted IFFT block is removed and a fast Fourier transform (FFT) is conducted. From the results on pilot-bearing carriers, a channel estimation algorithm delivers noise power and channel gain estimates facilitating the generation of hard or soft decisions on the encoded bits. The hard or soft decisions are finally de-interleaved and fed to the decoder that delivers bit streams transmitted for upper layer applications such as an Ethernet interface 22 or as an MPEG, JPEG or H264 compressed or uncompressed digital video signal 23.

Figure 7:
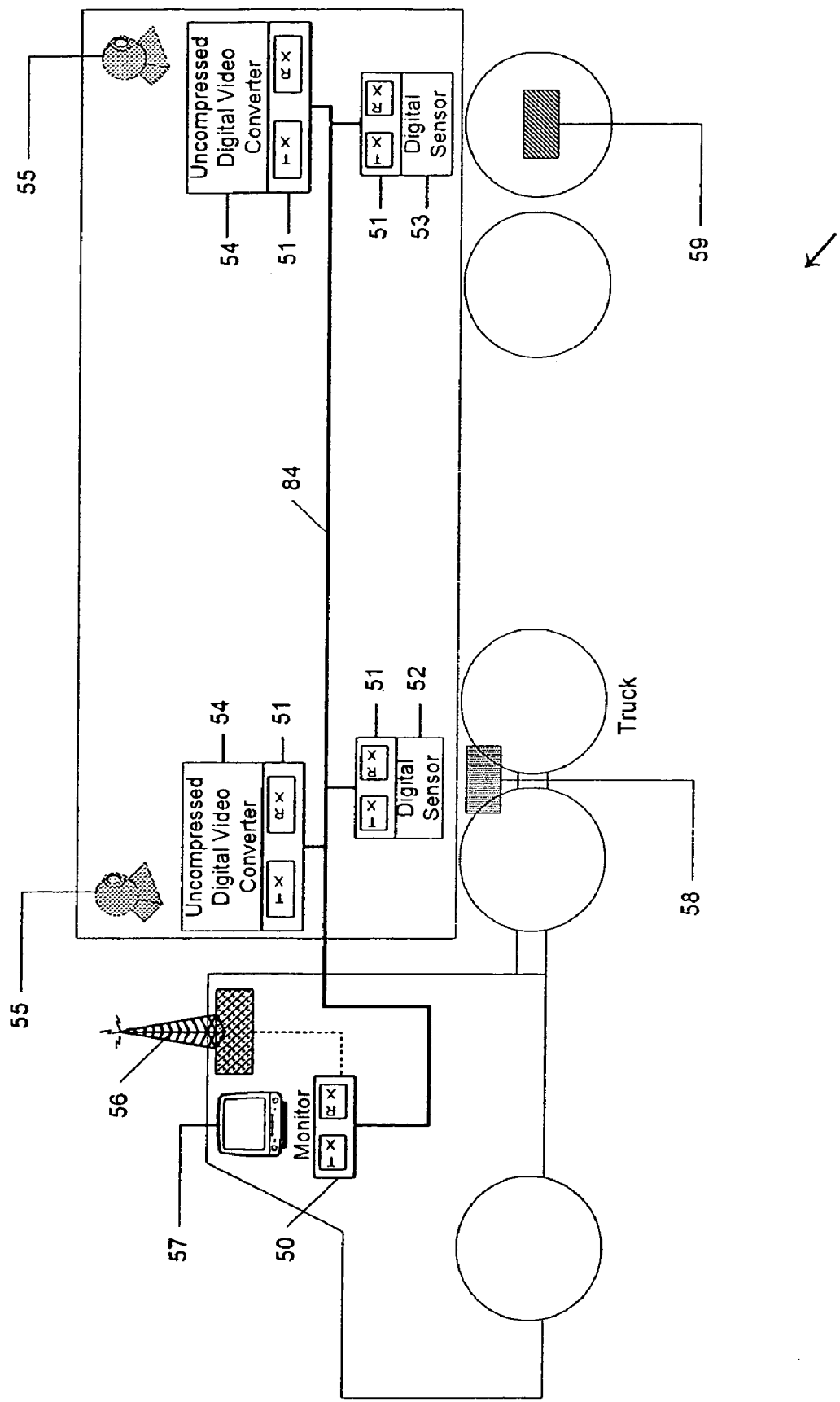
FIG. 7 is a block diagram of a communication system for moving vehicles utilizing wireless communication in accordance with seventh embodiment of the invention.

Referring now to FIG. 7 there is shown a block diagram of a communication system 160 for use in moving vehicles in accordance with seventh embodiment of the invention.

In order to avoid large amount of accidents, trucks in particular, need a camera 55 on the back and on the right side of the vehicle. The cameras 55 must show a real life picture and have a latency of 0.5 seconds or less. Therefore, because video compression is likely to cause at least 0.5 seconds delay on the actual event, an uncompressed video signal converter 54 and DSPM/DSPD 51 are used for this application to communicate over a DC wiring harness 84 of the vehicle. Preferably, the monitor 57 for the cameras is located next to the driver. Furthermore, the driver needs to know a multiplicity of safety information on the truck such as air brake pressure 58 provided by the sensor 52 and tire pressure 59 provided by the sensor 53, which data/and sensor control needs to be transmitted/received by the DSPM/DSPD 51 connecting the sensors 52 and 53 to the computer monitor 57 via DC wiring harness 84 and master modem 50, which safety information can be transmitted wirelessly to the truck owner station via antenna 56 on the vehicle.

Preferably, the master modem 50 sends signals all the time in one frequency band to the slaves 51 and the slaves 51 send information to the master modem in another frequency band with TDM using allocated timing slots. Alternatively, Ethernet protocol could be used for the TDM. Each slave modem could, alternatively, operate in a different frequency band such that the signals from the slave modems 51 to the master modem 50 are frequency division multiplexed. The use of encrypted data is important for this application.

Figure 8:
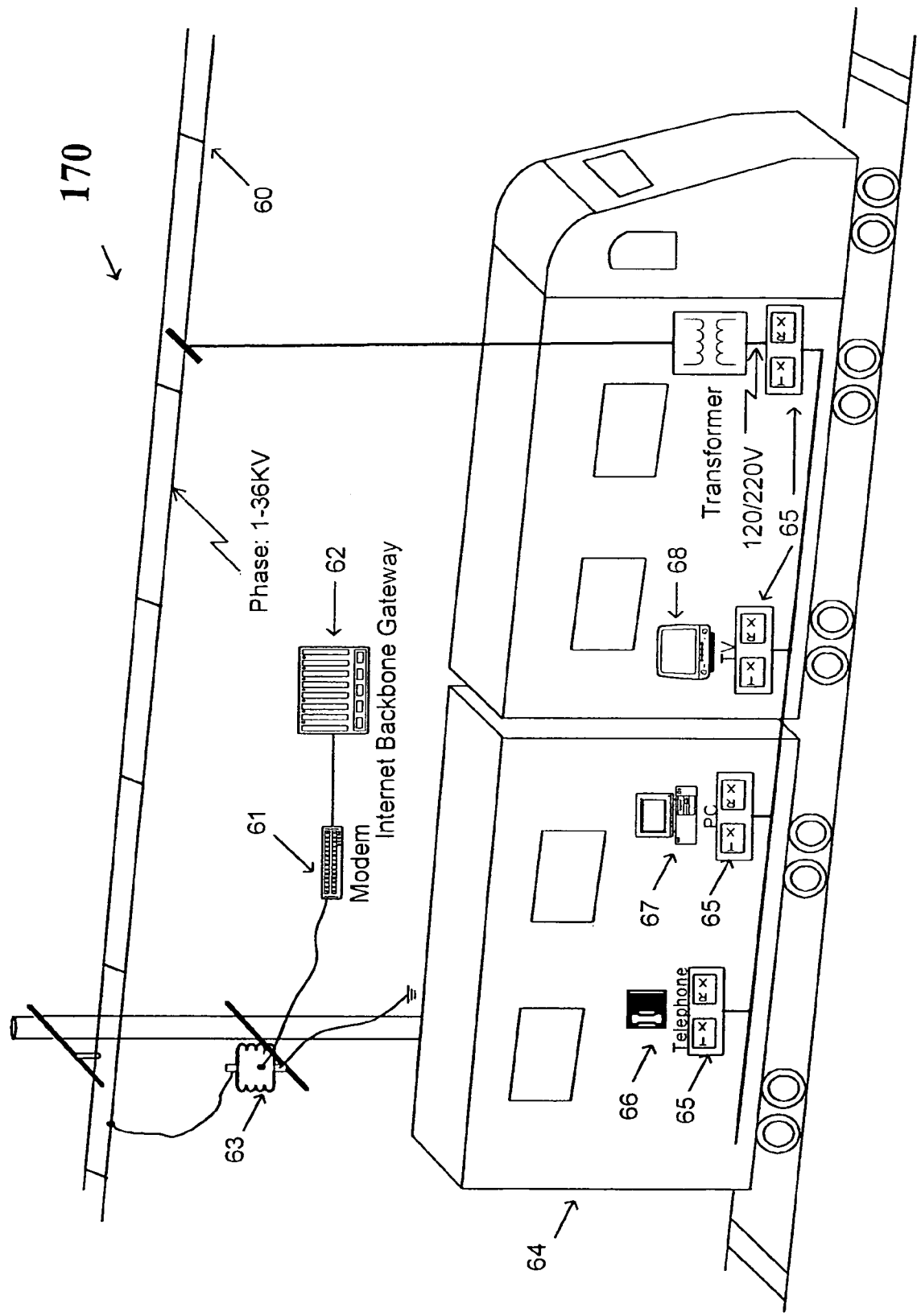
FIG. 8 is a block diagram of a communication system for moving vehicles utilizing a power line transmission media in accordance with an eighth embodiment of the invention.

Referring now to FIG. 8 there is shown a block diagram of a communication system 170 for use by trains in accordance with an eighth embodiment of the invention.

Electric trains typically receives electricity from a mid-voltage AC power line having a voltage of between one and thirty-six KV. The electric trains use a transformer to transform the AC power line voltage to a 120/220V low voltage power line.

In the eighth embodiment, video to a television receiver 68, voice to/from a telephone 66 and data to/from a computer 67 are transmitted and received by a moving vehicle like train 64 from the mid-voltage AC power line 60 through the transformer on the train 64 and the low voltage power line (120/220V) on the train. For a real time security video application, uncompressed video signals can be used. For internet video or TV/DVD quality, video compressed video can be used with either MPEG, JPEG or H264 format or any other type of video compression format.

Access to an Internet backbone gateway 62 is provided by mid-voltage coupler 63, which is connected to the mid-voltage power line 60 via a master modem 61. The master modem 61 transmits encrypted digital data signals via the mid-voltage coupler 63 and through the transformer on the train to the slave modems 65. The slave modems 65 send back encrypted digital data in a time division multiplexed (TDM) mode to the master modem 61. Alternatively, the outputs of each slave modems 65 could be at a different frequency band. The master modem 61 has the necessary address to find out what speed the devices, such as the PC 67 will need for Internet applications, the telephone 66 will need for phone calls, and the TV 68 will need for video applications, games, TV channels, security monitoring etc.

Figure 9:
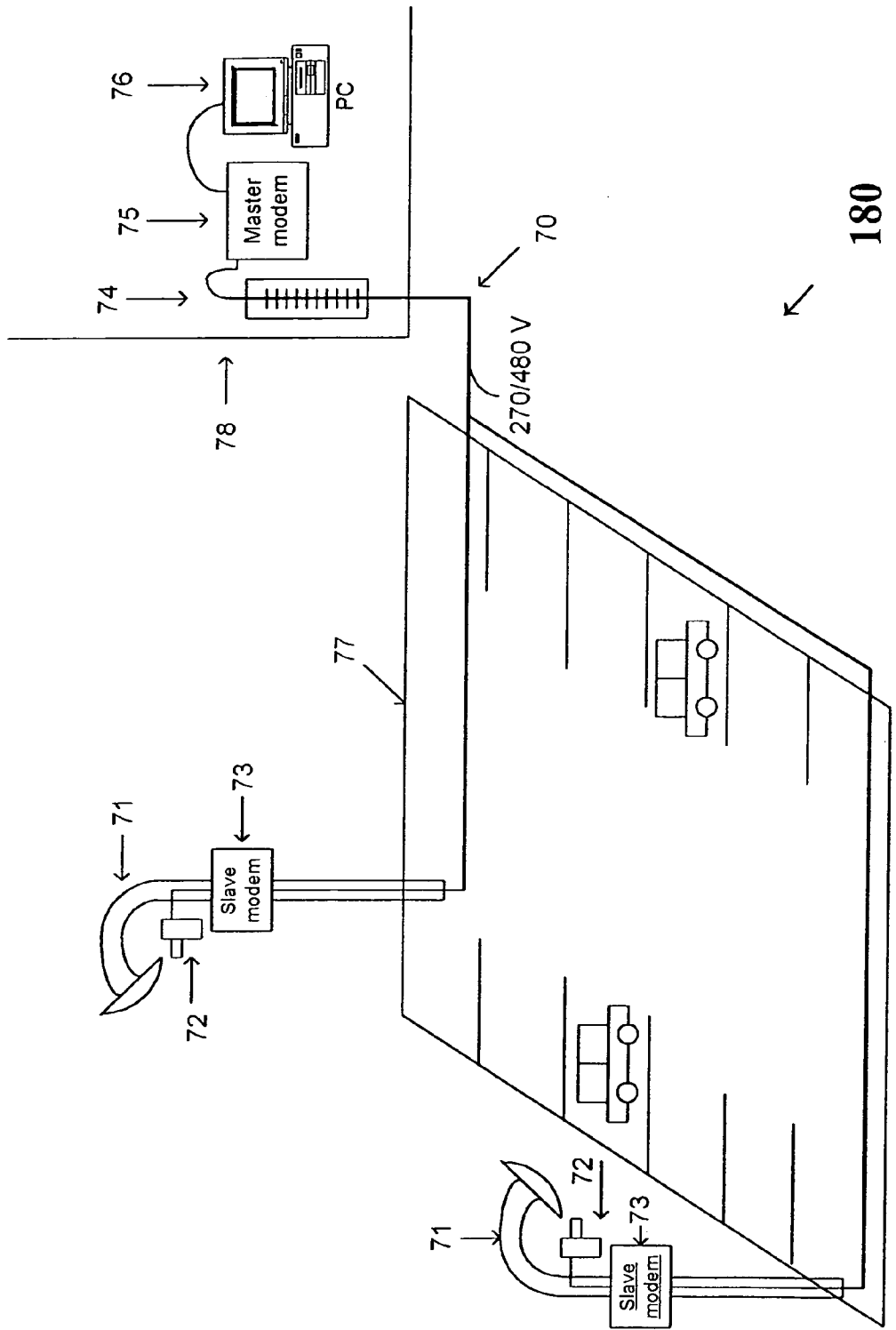
FIG. 9 is a block diagram of a communication system utilizing a power line transmission media in accordance with a ninth embodiment of the invention.

Referring to FIG. 9 there is shown a block diagram of a communication system 180 which utilizes a power line transmission media in accordance with a ninth embodiment of the invention.

Parking lots 77 typically have outside lamp poles 71 on which cameras 72 are installed. The cameras 72, which may have either analog or digital outputs, are connected to one of the slave DSP modems 73 that transmit digital signals over an underground 270/440/480V power line 70 to a master modem 75 using time division multiplexing (TDM). Alternatively, the output of each slave modem 73 could be at a different frequency band. Another, possible configuration would be to configure sub-networks such that the slave modems in each sub-network would transmit using TDM and each sub-network operates in a different frequency band.

The master modem 75 is usually located in a building 78 and connected to the power line 70 at the service entrance 74. Typically the master modem 75 is connected to a recording device like a computer 76. Because the underground wires 70 for the parking lots are individual wires and the characteristic of the individual wires can change every inch, the attenuation of such wires is higher then usual. Consequently, instead of using 200 MHz and higher frequencies, the preferred frequencies for this application are between 2-30 MHz. The use of encrypted data is important for this application too.

Generally, the lamps 71 are not turned on during the day therefore there is no AC voltage in the power lines 70. Power line carrier current signals can still be transmitted over such a power line 70 even if there is no AC voltage in those lines. The power supply in such a case for the slave modems can be achieved by either batteries, solar cells or a switching relay. Preferably, a switching relay is installed in each slave 73 and master modem 75 site that would supply low voltage AC or DC (12-48 V) to the slave modems 73 and to the cameras 72 over the power line during the day and such low voltage would not turn on the parking lights 71, and the relay would switch immediately to the 270/440/480V AC regular lights during night time over the same power line. The relay on the master modem 75 side would have a sensor to sense when the 270/440/480V power line is turned off and on and when the off state happens, the relay would connect the low voltage to the power line 70. Using a video compression, TDM, adaptive coding, adaptive modulation digital signal processing or an FM digital signal processing technique, multi-channel video can be transmitted simultaneously over such a power line 70 and multi-channel carrier frequencies and/or frequency band channels can be used to reach a very large number of video channels simultaneously in the range of several hundred video channels. For example using an MPEG II or MPEG 4 video compression technique, (which techniques compressing up to 100:1), a video channel will need not more than a several hundred Kbps throughput speed.

The present invention is not limited to the type of camera or VCR or DVD or other devices having outputs that are usually NTSC composite base band, S-video, digital FireWire or digital parallel bit streams. The present invention also is not limited to the input of a monitor or TV sets or a computer recorder or other devices that can use NTSC composite base band video, S-video, digital FireWire or digital parallel bit steams. The present invention can use all those inputs and outputs for digital video for power line or other media communication.

Furthermore, this digital compressed or uncompressed video and high speed data can be used in DC power line applications in trucks and busses, where the communication media would be a +12/+24/+48V power wire harness. In that case, for example, 400 Mbps speed from a FireWire interface can be used for data from multiple cameras and low speed control application devices like brake control devices, pressure control devices which is sent to the computer and display at the driver's position over the DC power line wire harness. Of course, due to safety issues, uncompressed video will be more useful because even 0.5 second of delay due to video compression would be an excessive delay for providing data to the driver while the driver is backing up.

Another application of the present invention is security monitoring over the power line using compressed or uncompressed digital video. Multiple video cameras located in a single premises and/or in a plurality of premises can simultaneously transmit video over the power line using modems that utilize time or frequency division multiplexing including OFDM or FM-OFDM. The video cameras can be connected to transmitting modems via the Internet. One receiving modem is able to receive all the transmitted video signals. The device(s) for receiving the transmitted video signals may also be connected to the receiving modem via the Internet. Furthermore, this home security systems can be interfaced to cellular telephones and video can be viewed on the cellular phone display. The present invention is also suitable for transmitting cable television signals over power lines from a cable television hub to a plurality of premises using OFDM or FM-OFDM.

Figure 10:
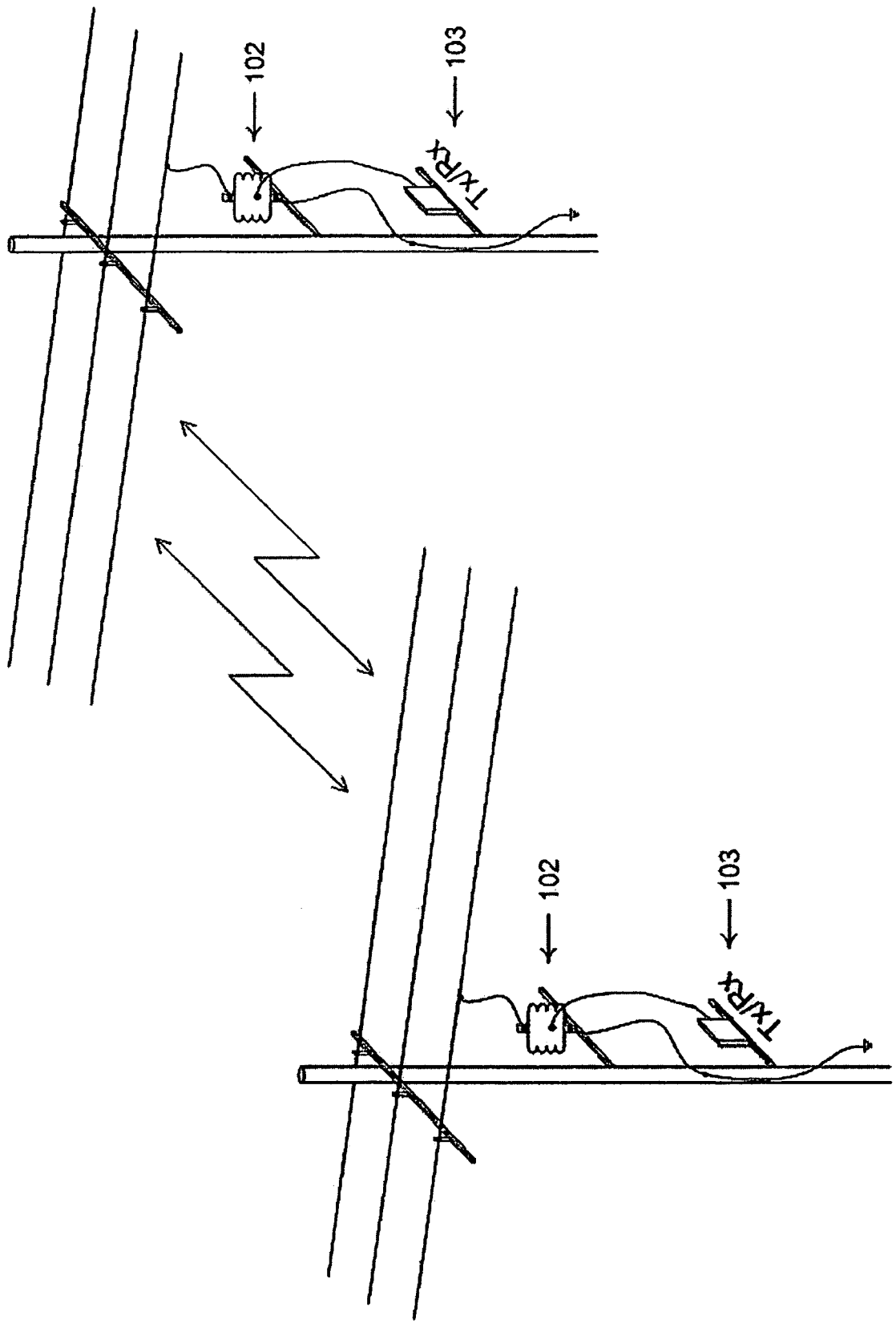
FIG. 10 is a diagram depicting the transmission of radio frequency signals between power lines.

Additionally, the present invention, using OFDM or FM-OFDM, may use one or more conductors of the power lines themselves to radiate and receive signals. Low voltage 120/240/480 volt power lines and mid-voltage 11/22/33 KV power lines are both suitable. As shown in FIG. 10, the transmission of signals may be from conductors of one power line to the conductors of another power line, where the wireless RF signals travel through the air, using power line couplers 102 and modems 103 connected to the power lines, thus increasing the range over which communication can be achieved. Also, as shown in FIG. 11, communication may be from one or more conductors of a power line directly to a person carrying a wireless communication device 100 or to a home equipped with one or more wireless transmitter/receivers 104, which connect to a computer 106 and/or a television receiver 105. Alternatively, a modem 104 that is connected the home power line acting as an antenna could provide a connection to the computer 106 and/or the television receiver 105. The wireless communication device 100 and the wireless transmitter/receivers 105 could be frequency division multiplexed or time division multiplexed.

The configuration shown in FIG. 11 can be extended to a large number of homes and mobile subscribers by sub-netting where the total number of homes/subscribers are divided geographically into separate sub-networks, the transmitter/receiver 103 simultaneously transmits and receives signals for each sub-network in a distinct frequency band, and the output of the slave modems within each sub-network are time division multiplexed. Consequently, the data rate over the power line can be increased proportionately to the number of bands.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A system for distributing signals over a vehicle power distribution system and for communicating between the vehicle and a remote station, the system comprising:

a first modem connected to the vehicle power distribution system, said first modem being configured to: (1) receive and modulate a carrier signal by at least one of a first source of video, a first sensor, a first computer, and a first telephone and provide a first modulated signal to the vehicle power distribution system, and (2) receive, second, third and fourth modulated signals from the vehicle power distribution system, demodulate the second, third and fourth modulated signals and provide a demodulated signal to at least one of a first video display, the first computer, and the first telephone;

a second modem connected to the vehicle power distribution system, said second modem being configured to: (1) receive and modulate a carrier signal by at least one of a second source of video, a second sensor, a second computer, and a second telephone and provide a second modulated signal to the vehicle power distribution system, and (2) receive the first, third and fourth modulated signals from the vehicle power distribution system, demodulate the first, third and fourth modulated signals and provide a demodulated signal to at least one of a second video display, the second computer, and the second telephone; and a third modem connected to the vehicle power distribution system, said third modem being configured to: (1) receive the first modulated signal and the second modulated signal from the vehicle power distribution system, demodulate the first and second modulated signals and (a) provide the demodulated signals to at least one of a monitor, and a computer and (b) remodulate the demodulated first modulated signal and the demodulated second modulated signal and transmit the remodulated signals to the remote station, and (2) receive a modulated signal from the remote station, demodulate the signal from the remote station and provide the demodulated signal to at least one of a third video display, a third computer, and a third telephone and remodulate the third modulated signal and provide a third modulated signal to the vehicle power distribution system, and (3) receive and modulate signals from at least one of a third source of video, the third computer, and the third telephone and provide a fourth modulated signal to at least one of the vehicle power distribution system and the remote station.

2. The system of claim 1, wherein the vehicle power distribution system distributes alternating current.

3. The system of claim 1, wherein the vehicle power distribution system distributes direct current.

4. The system of claim 1, wherein the signals transmitted between the vehicle and the remote station are encrypted.

5. The system of claim 1, wherein the signals transmitted between the vehicle and the remote station are transmitted wirelessly.

6. The system of claim 5, wherein the signals being transmitted between the vehicle and the remote station employ orthogonal frequency division modulation or frequency modulation-orthogonal frequency division modulation using carrier modulation selected from the group consisting of BPSK, QPSK, 16QAM, 32QAM, 64QAM, FSK, FOK and spread spectrum.

7. The system of claim 1, wherein the signals being transmitted between the vehicle and the remote station are transmitted via a vehicle electrification system.

8. The system of claim 7, wherein the remote station is wirelessly connected to the electrification system.

9. The system of claim 7, wherein the signals being transmitted between the vehicle and the remote station employ orthogonal frequency division modulation or frequency modulation-orthogonal frequency division modulation using carrier modulation selected from the group consisting of BPSK, QPSK, 16QAM, 32QAM, 64QAM, FSK, FOK and spread spectrum.

10. The system of claim 1, wherein the sensors include at least one of an air pressure sensor, a tire pressure sensor and an oil pressure sensor.

11. The system of claim 1, wherein the source of video is a camera located on at least one of the rear of the vehicle and the right side of the vehicle.

12. The system of claim 11, wherein the video is uncompressed video.

13. The system of claim 1, wherein the signals transmitted between the vehicle and the remote station are transmitted while the vehicle is moving.

14. The system of claim 1, wherein the signals transmitted between the first modem, the second modem and the third modem are time division multiplexed on the power distribution system.

15. The system of claim 1, wherein the signals transmitted between the first modem, the second modem and the third modem are frequency division multiplexed on the power distribution system.

16. The system of claim 1, wherein at least one of the first modem, the second modem and the third modem includes a video compression module capable of compressing the video signal received from the source of video prior to modulating the video signal.

17. A monitoring system for twenty four hour monitoring of a parking lot, in which monitoring signals are transmitted though a lighting power system of the parking lot, the monitoring system comprising:
   a master modem configured to receive a plurality of modulated signals from the lighting power system of the parking lot, and provide a plurality of demodulated signals to a recording device, and
   a plurality of slave modems, each of which is configured to receive a video signal from a camera, modulate the video signal and provide the modulated signal to the lighting power system, wherein each of the slave modems and each of the cameras receive operating power from the lighting power system, wherein the lighting power is available for only a portion of each twenty four hour period, and wherein each slave modem and each camera includes means for operating when the lighting power is not available, wherein the master modem and each slave modem are respectively connected to the lighting power system via a coupler, the coupler being either a capacitive or a resin/dielectric-filled type of coupler which matches the characteristic impedance of the lighting power system TDM the characteristic impedance of the modem.

18. The monitoring system of claim 17, wherein the outputs of the plurality of slave modems are frequency division multiplexed on the lighting power system.

19. The monitoring system of claim 17, wherein the outputs of the plurality of slave modems are time division multiplexed on the lighting power system.

20. The monitoring system of claim 17, wherein each slave modem includes batteries for operating when the lighting power is not available.

21. The monitoring system of claim 17, wherein each slave modem includes a sun operated source of power for operating when the lighting power is not available.

22. The monitoring system of claim 17, wherein the signals being transmitted between each slave modem and the master modem employ orthogonal frequency division modulation or frequency modulation-orthogonal frequency division modulation using carrier modulation selected from the group consisting of BPSK, QPSK, 16QAM, 32QAM, 64QAM, FSK, FOK and spread spectrum.

23. The monitoring system of claim 17, wherein the signals being transmitted between each slave modem and the master modem are encrypted.

24. The monitoring system of claim 17, wherein each slave modem includes a video compression module capable of compressing the video signal received from the camera.

25. A monitoring system for twenty four hour monitoring of a parking lot, in which monitoring signals are transmitted though a lighting power system of the parking lot, the monitoring system comprising:
a master modem configured to receive a plurality of modulated signals from the lighting power system of the parking lot, and provide a plurality of demodulated signals to a recording device, and
a plurality of slave modems, each of which is configured to receive a video signal from a camera, modulate the video signal and provide the modulated signal to the lighting power system, wherein each of the slave modems and each of the cameras receive operating power from the lighting power system, wherein the lighting power is available for only a portion of each twenty four hour period, and wherein each slave modem and each camera includes means for operating when the lighting power is not available, wherein the lighting power system provides a low voltage when the lighting power is not available, said slave modems and said cameras each including a switch for supplying the low voltage to said slave modems and said cameras.

26. A security monitoring system which utilizes a power line within a structure for transmission of signals between components attached thereto, comprising:
a master modem configured to receive a plurality of modulated signals from the power line, to provide a demodulated signal for transmission over the Internet and to receive commands from the Internet, and
a plurality of slave modems, each of which is configured to receive a video signal from a camera, modulate the video signal and provide the modulated signal to the power line, wherein the video signal from any one of the cameras may be selected for transmission over the Internet by the reception of an appropriate one of the commands, wherein the master modem and each slave modem are respectively connected to the lighting power system via a coupler, the coupler being either a capacitive or a resin/dielectric-filled type of coupler which matches the characteristic impedance of the lighting power system to the characteristic impedance of the modem.

27. The monitoring system of claim 26, wherein the outputs of the plurality of slave modems are frequency division multiplexed on the lighting power system.

28. The monitoring system of claim 26, wherein the outputs of the plurality of slave modems are time division multiplexed on the lighting power system.

29. The monitoring system of claim 26, wherein the signals being transmitted between each slave modem and the master modem employ orthogonal frequency division modulation or frequency modulation-orthogonal frequency division modulation using carrier modulation selected from the group consisting of BPSK, QPSK, 16QAM, 32QAM, 64QAM, FSK, FOK and spread spectrum.

30. A system for transmitting a video signal over an electrical power line connected to a plurality of premises comprising:
a first modem, the output of which is connected to the power line, said modem receiving the video signal from a source and providing a modulated signal to the power line;
a second modem, the input of which is connected to the power line, said modem demodulating the modulated signal, and
a display device connected to the output of said second modem, wherein the video signal is transmitted from the source to said first modem via the Internet, wherein the first modem and the second modem are each connected to the electrical power line via a coupler, the coupler being either a capacitive or a resin/dielectric-filled type of coupler which matches the characteristic impedance of the electrical power line to the characteristic impedance of the modem.

31. The system of claim 30, wherein the source of the video is selected from the group consisting of a camera and a television channel.

32. The system of claim 30, wherein the modulated signal being transmitted between the first modem and the second modem employs orthogonal frequency division modulation or frequency modulation-orthogonal frequency division modulation using carrier modulation selected from the group consisting of BPSK, QPSK, 16QAM, 32QAM, 64QAM, FSK, FOK and spread spectrum.

33. A system for transmitting a video signal over an electrical power line connected to a plurality of premises comprising:
a first modem, the output of which is connected to the power line, said modem receiving the video signal from a source and providing a modulated signal to the power line;
a second modem, the input of which is connected to the power line and the output of which is connected to the Internet at a first access point, said second modem demodulating the modulated signal, and
a display device connected to the Internet at a second access point for displaying the video signal, wherein the first modem and the second modem are each connected to the electrical power line via a coupler, the coupler being either a capacitive or a resin/dielectric-filled type of coupler which matches the characteristic impedance of the electrical power line to the characteristic impedance of the modem.

34. The system of claim 33, wherein the modulated signal being transmitted between the first modem and the second modem employs orthogonal frequency division modulation or frequency modulation-orthogonal frequency division modulation using carrier modulation selected from the group consisting of BPSK, QPSK, 16QAM, 32QAM, 64QAM, FSK, FOK and spread spectrum.

35. A system for transmitting a cable television signal over an electrical power line connected to a plurality of premises comprising:
a first modem for receiving the cable television signal, the output of said first modem being connected to the power line;
a second modem, the input of said second modem being connected to the power line for receiving the cable television signal, and
a display device connected to the output of said second modem, wherein orthogonal frequency division modulation or frequency modulation-orthogonal frequency division modulation is used for transmitting the cable television signal over the power line, wherein the first modem and the second modem are each connected to the electrical power line via a coupler, the coupler being either a capacitive or a resin/dielectric-filled type of coupler which matches the characteristic impedance of the electrical power line to the characteristic impedance of the modem.

* * * * *